US011954964B2

(12) United States Patent
Barbour et al.

(10) Patent No.: US 11,954,964 B2
(45) **Date of Patent: *Apr. 9, 2024**

(54) ELECTRONIC GAMING MACHINE WITH ACCESS DOOR

(71) Applicant: Aristocrat Technologies, Inc., Las Vegas, NV (US)

(72) Inventors: Timothy Barbour, Nolensville, TN (US); Lori Weaver, Nashville, TN (US); Ryan Priddy, Franklin, TN (US); Kiran Dundaraddi, Las Vegas, NV (US); William Lamb, Eagleville, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 157 days.

This patent is subject to a terminal disclaimer.

(21) Appl. No.: 17/529,102

(22) Filed: Nov. 17, 2021

(65) Prior Publication Data

US 2022/0076527 A1 Mar. 10, 2022

Related U.S. Application Data

(63) Continuation of application No. 16/867,290, filed on May 5, 2020, now Pat. No. 11,195,369.

(51) Int. Cl.
*G07F 17/32* (2006.01)
*G07F 17/34* (2006.01)
*G07F 17/42* (2006.01)

(52) U.S. Cl.
CPC ...... *G07F 17/3216* (2013.01); *G07F 17/3209* (2013.01); *G07F 17/3211* (2013.01);
(Continued)

(58) Field of Classification Search
None
See application file for complete search history.

(56) References Cited

U.S. PATENT DOCUMENTS

D77,825 S 2/1929 Fey
D139,949 S 1/1945 Haggestrom
(Continued)

FOREIGN PATENT DOCUMENTS

AU 2001051810 A1 12/2001
CA 178255 11/2018
(Continued)

OTHER PUBLICATIONS

Office Action dated Apr. 18, 2022 for U.S. Appl. No. 29/696,682 (pp. 1-6).

(Continued)

*Primary Examiner* — Ronald Laneau
(74) *Attorney, Agent, or Firm* — Armstrong Teasdale LLP

(57) ABSTRACT

A pedestal system including a pedestal is described. The pedestal includes a base, an access door, and a button deck. The access door is rotatably coupled to the pedestal between a first open position and a first closed position wherein the access door is configured to allow access to an interior portion of the pedestal. The button deck includes one or more of a display and a button panel including one or more buttons. The button deck is rotatably coupled to the pedestal between a second open position and a second closed position wherein the button deck is configured to allow access to the interior portion of the pedestal when the button deck is in the second open position.

20 Claims, 13 Drawing Sheets

(52) U.S. Cl.
CPC ...... *G07F 17/3241* (2013.01); *G07F 17/3246* (2013.01); *G07F 17/42* (2013.01); *G07F 17/3239* (2013.01); *G07F 17/3267* (2013.01); *G07F 17/34* (2013.01)

(56) References Cited

U.S. PATENT DOCUMENTS

| | | | |
|---|---|---|---|
| 3,788,333 | A | 1/1974 | Johnson |
| D245,359 | S | 8/1977 | Wilke |
| 4,084,194 | A | 4/1978 | Hector |
| 4,434,931 | A | 3/1984 | Hunt |
| D321,095 | S | 10/1991 | Bockwoldt |
| 5,129,330 | A | 7/1992 | McKay |
| D344,296 | S | 2/1994 | McKay |
| 5,310,152 | A | 5/1994 | O'Neill |
| 5,533,605 | A | 7/1996 | Mays |
| D376,391 | S | 12/1996 | Okumara |
| 5,653,436 | A | 8/1997 | Zouzoulas |
| 5,676,231 | A | 10/1997 | Legras |
| D392,686 | S | 3/1998 | Sarkisian |
| 5,730,271 | A | 3/1998 | Buchman |
| D405,473 | S | 2/1999 | Tikhonski |
| D407,119 | S | 3/1999 | Kwan |
| 5,907,141 | A | 5/1999 | Deaville |
| D411,582 | S | 6/1999 | Muraki |
| 5,993,317 | A | 11/1999 | Majima |
| 5,996,888 | A | 12/1999 | Gromatzky |
| 6,019,207 | A | 2/2000 | Cole |
| D421,631 | S | 3/2000 | Tsuda |
| D434,451 | S | 11/2000 | Grimshaw |
| D452,710 | S | 1/2002 | Ragot |
| D455,789 | S | 4/2002 | Schlueter |
| D460,915 | S | 7/2002 | Lynch |
| 6,464,586 | B1 | 10/2002 | Kamata |
| D467,977 | S | 12/2002 | Gatto |
| 6,530,842 | B1 | 3/2003 | Wells |
| 6,749,515 | B2 | 6/2004 | Hedrick |
| D501,889 | S | 2/2005 | Harris |
| D509,543 | S | 9/2005 | Hillstrom |
| 6,976,919 | B2 | 12/2005 | Cole |
| 7,044,423 | B2 | 5/2006 | Bober |
| D537,482 | S | 2/2007 | Gadda |
| D544,027 | S | 6/2007 | Nunn |
| 7,267,613 | B2 | 9/2007 | Cole |
| D562,576 | S | 2/2008 | Ritzel |
| D577,075 | S | 9/2008 | Bode |
| 7,533,762 | B2 | 5/2009 | Kuttel |
| D594,068 | S | 6/2009 | Hsu |
| D603,909 | S | 11/2009 | De Viveiros Ortiz |
| 7,832,799 | B2 | 11/2010 | Davis, Jr. |
| 7,891,551 | B2 | 2/2011 | Cha |
| D637,651 | S | 5/2011 | Hase |
| D639,086 | S | 6/2011 | Curbbun |
| 7,971,775 | B2 | 7/2011 | Saltsov |
| 8,012,027 | B2 | 9/2011 | McGahn |
| D647,143 | S | 10/2011 | Yi |
| 8,083,458 | B2 | 12/2011 | Wilkie |
| 8,113,517 | B2 | 2/2012 | Canterbury |
| D658,721 | S | 5/2012 | Yang |
| 8,210,949 | B2 | 7/2012 | Graf |
| 8,356,703 | B2 | 1/2013 | Vysma |
| 8,366,555 | B2 | 2/2013 | McGahn |
| 8,419,550 | B2 | 4/2013 | Anthony |
| 8,444,482 | B2 | 5/2013 | Aoki |
| 8,576,553 | B2 | 11/2013 | Myerchin |
| 8,651,963 | B1 * | 2/2014 | Thompson .......... G07F 17/3202 463/16 |
| D704,273 | S | 5/2014 | Chudek |
| D706,741 | S | 6/2014 | Myers |
| 8,740,188 | B1 | 6/2014 | Foster |
| 8,747,225 | B2 | 6/2014 | Canterbury |
| D708,459 | S | 7/2014 | Heirakuji |
| 8,783,552 | B2 | 7/2014 | Xu |
| 8,858,343 | B2 | 10/2014 | Filipour |
| 8,894,487 | B2 | 11/2014 | Granger |
| D719,615 | S | 12/2014 | Inoue |
| D723,626 | S | 3/2015 | Vasquez |
| 8,986,109 | B2 | 3/2015 | Graf |
| D740,887 | S | 10/2015 | Randazzo |
| D748,729 | S | 2/2016 | Thomaselli |
| 9,721,414 | B2 | 8/2017 | Ledoux |
| 9,756,941 | B1 | 9/2017 | Rowland |
| D802,676 | S | 11/2017 | Steelman |
| D805,047 | S | 12/2017 | Dry |
| D808,467 | S | 1/2018 | Huang |
| 9,858,750 | B2 | 1/2018 | Kovacs |
| D812,145 | S | 3/2018 | Huang |
| D818,048 | S | 5/2018 | Calhoun |
| D820,915 | S | 6/2018 | Lee |
| D824,353 | S | 7/2018 | Won |
| D833,535 | S | 11/2018 | Lim |
| D839,357 | S | 1/2019 | Steelman |
| D842,929 | S | 3/2019 | Hung |
| D843,463 | S | 3/2019 | Castro |
| D843,465 | S | 3/2019 | Castro |
| D843,472 | S | 3/2019 | Castro |
| D843,476 | S | 3/2019 | Lesley |
| D843,479 | S | 3/2019 | Castro |
| D844,062 | S | 3/2019 | Lesley |
| D847,905 | S | 5/2019 | Lewis |
| D848,529 | S | 5/2019 | Lee |
| D849,149 | S | 5/2019 | Bussey |
| 10,287,148 | B2 | 5/2019 | Urban |
| D852,890 | S | 7/2019 | Ross |
| D864,305 | S | 10/2019 | Ortiz De Viveiros |
| 10,445,977 | B2 | 10/2019 | Tovar |
| D866,666 | S | 11/2019 | Ditton |
| D867,461 | S | 11/2019 | Huang |
| D868,716 | S | 12/2019 | Hodgson |
| 10,502,360 | B2 | 12/2019 | Castro |
| 10,515,212 | B1 * | 12/2019 | McClintock ............ G06F 21/57 |
| 10,573,118 | B2 | 2/2020 | Goldstein |
| D883,278 | S | 5/2020 | Yepez |
| D887,496 | S | 6/2020 | Urban |
| D889,546 | S | 7/2020 | Jones |
| D889,547 | S | 7/2020 | Jones |
| D890,848 | S | 7/2020 | Johnson |
| 10,702,772 | B2 | 7/2020 | Achmueller |
| 10,716,224 | B2 | 7/2020 | Dunn |
| D893,630 | S | 8/2020 | Urban |
| 10,810,832 | B2 | 10/2020 | Gallagher |
| 10,825,286 | B2 | 11/2020 | Gallagher |
| D904,098 | S | 12/2020 | Le |
| D905,172 | S | 12/2020 | Boese |
| D907,124 | S | 1/2021 | Demarco |
| D907,708 | S | 1/2021 | Demarco |
| D907,709 | S | 1/2021 | Demarco |
| D907,714 | S | 1/2021 | Alexander |
| D908,171 | S | 1/2021 | Demarco |
| D908,173 | S | 1/2021 | Demarco |
| D909,479 | S | 2/2021 | Abele |
| D909,490 | S | 2/2021 | Demarco |
| D909,491 | S | 2/2021 | Demarco |
| D910,119 | S | 2/2021 | Demarco |
| D910,763 | S | 2/2021 | Demarco |
| D911,055 | S | 2/2021 | Wang |
| 10,922,914 | B2 | 2/2021 | Nireki |
| D911,724 | S | 3/2021 | Gary |
| D911,992 | S | 3/2021 | Stinson |
| D913,379 | S | 3/2021 | Calhoun |
| D915,093 | S | 4/2021 | Shen |
| D915,315 | S | 4/2021 | Ho |
| D917,621 | S | 4/2021 | Kaminkow |
| D918,300 | S | 5/2021 | Demarco |
| D918,303 | S | 5/2021 | Demarco |
| D918,850 | S | 5/2021 | Shim |
| D918,852 | S | 5/2021 | Shim |
| D919,010 | S | 5/2021 | Bussey |
| D919,585 | S | 5/2021 | Shim |
| D919,586 | S | 5/2021 | Lim |
| D920,323 | S | 5/2021 | Lee |
| D920,429 | S | 5/2021 | Hoinowski |
| D921,762 | S | 6/2021 | Hodgson |
| 11,151,833 | B2 | 10/2021 | Hemerick |

(56) References Cited

U.S. PATENT DOCUMENTS

| | | | | |
|---|---|---|---|---|
| 11,151,834 | B2 | 10/2021 | Urban | |
| 11,195,369 | B2 | 12/2021 | Barbour | |
| D959,557 | S | 8/2022 | Sakai | |
| D971,323 | S | 11/2022 | Hoinowski | |
| D971,324 | S | 11/2022 | Park | |
| 11,532,199 | B2 | 12/2022 | Urban | |
| D978,246 | S | 2/2023 | Turgel | |
| D978,249 | S | 2/2023 | Urban | |
| 2002/0056960 | A1 | 5/2002 | Bergeron | |
| 2002/0066636 | A1 | 6/2002 | Saltsov | |
| 2002/0198034 | A1 | 12/2002 | Wang | |
| 2003/0064791 | A1 | 4/2003 | Hedrick | |
| 2003/0195037 | A1 | 10/2003 | Vuong | |
| 2005/0109892 | A1 | 5/2005 | Bober | |
| 2005/0212656 | A1 | 9/2005 | Denison | |
| 2005/0277477 | A1 | 12/2005 | Hajder | |
| 2006/0081441 | A1 | 4/2006 | Vysma | |
| 2006/0205504 | A1 | 9/2006 | Okada | |
| 2007/0000993 | A1 | 1/2007 | Graef | |
| 2007/0099708 | A1 | 5/2007 | Okada | |
| 2008/0055491 | A1 | 3/2008 | Gordon | |
| 2008/0087521 | A1 | 4/2008 | Cole | |
| 2008/0113740 | A1 | 5/2008 | McGahn | |
| 2008/0113768 | A1 | 5/2008 | Baerlocher | |
| 2008/0113820 | A1 | 5/2008 | Tedsen | |
| 2008/0132313 | A1 | 6/2008 | Rasmussen | |
| 2008/0254862 | A1 | 10/2008 | Mattice | |
| 2008/0254881 | A1 | 10/2008 | Lutnick | |
| 2009/0280911 | A1 | 11/2009 | Tsao | |
| 2010/0102502 | A1 | 4/2010 | Saltsov | |
| 2010/0120530 | A1 | 5/2010 | Lesley | |
| 2010/0289208 | A1 | 11/2010 | Clauser | |
| 2011/0011699 | A1 | 1/2011 | Shuren | |
| 2011/0094850 | A1 | 4/2011 | Seki | |
| 2013/0035159 | A1 | 2/2013 | Cornell | |
| 2013/0180821 | A1 | 7/2013 | Clauser | |
| 2015/0336491 | A1 | 11/2015 | Abe | |
| 2016/0125681 | A1 | 5/2016 | Ledoux | |
| 2017/0039812 | A1 | 2/2017 | Baron | |
| 2017/0169663 | A1 | 6/2017 | Froy | |
| 2017/0294072 | A1 | 10/2017 | Achmüller | |
| 2018/0053373 | A1 | 2/2018 | Goldstein | |
| 2018/0075707 | A1 | 3/2018 | Hirai | |
| 2018/0082523 | A1 | 3/2018 | Palermo | |
| 2018/0190068 | A1 | 7/2018 | Priddy | |
| 2019/0012874 | A1 | 1/2019 | Goldstein | |
| 2019/0046872 | A1 | 2/2019 | Glenn, II | |
| 2019/0080547 | A1 | 3/2019 | Urban | |
| 2019/0096161 | A1 | 3/2019 | Barbour | |
| 2019/0096169 | A1 | 3/2019 | Tovar | |
| 2019/0096170 | A1 | 3/2019 | Lewis | |
| 2019/0096174 | A1 | 3/2019 | Ambrecht | |
| 2019/0099000 | A1 | 4/2019 | Waller | |
| 2019/0102982 | A1 | 4/2019 | Barbour | |
| 2019/0254433 | A1 | 8/2019 | Smit | |
| 2020/0090455 | A1 | 3/2020 | Ambrecht | |
| 2020/0312088 | A1* | 10/2020 | Penacho | G07F 17/3244 |
| 2021/0350656 | A1 | 11/2021 | Barbour | |
| 2022/0101685 | A1 | 3/2022 | Rodriguez | |
| 2022/0148374 | A1* | 5/2022 | Penacho | G07F 17/34 |
| 2022/0301384 | A1 | 9/2022 | Rodriguez | |
| 2023/0045373 | A1* | 2/2023 | Rodd | G07F 17/3216 |
| 2023/0111030 | A1* | 4/2023 | McClintock | A63F 13/90<br>463/13 |
| 2023/0121737 | A1* | 4/2023 | Winston | G06Q 50/34<br>463/30 |

FOREIGN PATENT DOCUMENTS

| | | | |
|---|---|---|---|
| DE | 0015402120001 | | 6/2009 |
| DE | 0015402380001 | | 8/2009 |
| DE | 0028613360001 | | 11/2015 |
| EP | 1778375 | | 5/2007 |
| JP | 1101243 | | 2/2001 |
| JP | 2002263262 | A | 9/2002 |
| JP | 1484230 | | 10/2013 |
| WO | 2005094957 | A1 | 10/2005 |

OTHER PUBLICATIONS

Office Action (Non-Final Rejection) dated Jun. 22, 2022 for U.S. Appl. No. 17/384,199 (pp. 1-9).

Office Action dated Aug. 4, 2022 for U.S. Appl. No. 29/708,718 (pp. 1-5).

Office Action dated Aug. 4, 2022 for U.S. Appl. No. 29/716,520 (pp. 1-6).

Notice of Allowance dated Oct. 26, 2022 for U.S. Appl. No. 29/696,682 (pp. 1-5).

Flappy Bird arcade cabinet will empty your wallet in record time, Fingas, Jan. 10, 2015, retrieved from https://www.engadget.com/2015/01/10/flappy-bird-arcade-cabinet/.

World's Largest Pac-Man Game Overview, Bandai Namco, Jul. 11, 2016, retrieved from https://www.youtube.com/watch?time_continue=54&v=4GqS9TTecGc.

ICE Debuts Shell Game Addition to Price Is Right Redemption Lineup, Montano, Jun. 5, 2011, retrieved from https://www.vendingtimes.(X)m/articles/ice-debuts-shell-game-addition-to-price-is-right-r-8412?d=5FF3782D18934396BD83A14B3BD1E0BC.

SD Ped pro, Xtension, Sep. 28, 2014, retrieved from http://www.xtensiongaming.com/products/xtension-sit-down-pedestal-arcade-cabineet-for-fight-sticks/attachment/sd-ped-pro/.

Incredible Technologies Details Golden Tee Live 2012, ARCADEHERO, Aug. 25, 2011, retrieved from http://arcadeheroes.com/2011/08/25/incredible-technologies-details-golden-tee-live-2012/.

NOVOMATIC to showcase latest products at Peru Gaming Show, Jun. 2, 2016, retrieved from http://www.innovategaming.com/c63114.

Introductie Fazi Roulette, Elam Group, Jun. 10, 2018, retrieved from https://www.youtube.com/watch?v=RLrFI5QDT5U.

Office Action dated Mar. 25, 2020, for U.S. Appl. No. 29/658,892 (pp. 1-10).

Office Action dated Apr. 29, 2021 for U.S. Appl. No. 16/867,290 (pp. 1-12).

Office Action dated Sep. 18, 2020 for U.S. Appl. No. 29/658,892 (pp. 1-5).

Notice of Allowance dated Dec. 31, 2020 for U.S. Appl. No. 29/658,892 (pp. 1-5).

Notice of Allowance dated Jul. 8, 2021 for U.S. Appl. No. 29/768,121 (pp. 1-10).

Notice of Allowance dated Aug. 5, 2021 for U.S. Appl. No. 16/867,290 (pp. 1-7).

Notice of Allowance dated Nov. 1, 2021 for U.S. Appl. No. 16/867,290 (pp. 1-7).

Office Action dated Jan. 7, 2022 for U.S. Appl. No. 29/696,682 (pp. 1-8).

Office Action (Notice of Allowance and Fees Due (PTOL-85)) dated Dec. 7, 2022 for U.S. Appl. No. 17/384,199 (pp. 1-7).

Notice of Allowance dated Jan. 13, 2023 for U.S. Appl. No. 29/708,718 (pp. 1-7).

Office Action (Notice of Allowance and Fees Due (PTOL-85)) dated Aug. 4, 2023 for U.S. Appl. No. 17/865,016 (pp. 1-7).

Office Action dated Aug. 9, 2023 for U.S. Appl. No. 29/775,222 (pp. 1-10).

Office Action (Non-Final Rejection) dated Sep. 8, 2023 for U.S. Appl. No. 17/389,076 (pp. 1-5).

Office Action dated Oct. 17, 2023 for U.S. Appl. No. 18/168,361 (pp. 1-9).

Office Action (Non-Final Rejection) dated Oct. 17, 2023 for U.S. Appl. No. 18/168,361 (pp. 1-8).

* cited by examiner

ELECTRONIC GAMING MACHINE WITH ACCESS DOOR

CROSS REFERENCE TO RELATED APPLICATIONS

This application is a continuation of and claims priority to U.S. patent application Ser. No. 16/867,290, filed May 5, 2020, and is related to U.S. patent application Ser. No. 29/658,892, filed Aug. 3, 2018, and U.S. patent application Ser. No. 29/696,682, filed Jun. 28, 2019, the disclosures of which are hereby incorporated by reference in their entireties.

TECHNICAL FIELD

The field of disclosure relates generally to an electronic gaming machine, and more particularly to a pedestal system including a rotatable access door and a rotatable button deck that provide access to an internal portion of the pedestal.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION OF THE INVENTION

In one aspect, a pedestal system including a pedestal is described. The pedestal includes a base, an access door, and a button deck. The access door is rotatably coupled to the pedestal between a first open position and a first closed position wherein the access door is configured to allow access to an interior portion of the pedestal. The button deck includes one or more of a display and a button panel including one or more buttons. The button deck is rotatably coupled to the pedestal between a second open position and a second closed position wherein the button deck is configured to allow access to the interior portion of the pedestal when the button deck is in the second open position.

In another aspect, a pedestal system including a pedestal is described. The pedestal includes a base, an access door, a button deck, and a bill validator. The access door is rotatably coupled to the pedestal between an open position and a closed position wherein the access door is configured to allow access to an interior portion of the pedestal when the access door is in the open position. The button deck includes one or more of a display and a button panel including one or more buttons. The bill validator is located in the interior portion of the pedestal.

DETAILED DESCRIPTION

A pedestal system for an electronic gaming machine (EGM) is described herein. The pedestal system includes a pedestal with a button deck and an access door that are both rotatably attached to the pedestal. Specifically, the button deck and access door are both rotatable from a closed position to an open position that provides access to an internal portion of the pedestal. Upon rotating the button deck and/or access door to the open position, inner components of the pedestal may be accessed (e.g., a ticket printer, logic cage, bill validator, etc.). The access door may become unlocked while in the closed position by pulling a handle on the button deck. Upon rotating the access door to the open position, pull pins or a release latch may be accessed that unlock the button deck such that the button deck can be rotated to the open position.

At least some of the technical problems addressed by this system includes: (a) difficulty accessing inner components of an EGM by credentialed operators; (b) difficulty in accommodating legroom and other spatial requirements for different players while operating an EGM; (c) difficulty in configuring a button deck for credentialed operators to complete maintenance tasks; and (d) difficulty in configuring a display device proximate to the pedestal system to allow credentialed operators to change and access the display device.

The technical effects and advantages achieved by this system include at least one of (a) allowing easy access to inner components of a game cabinet to credentialed users; (b) accommodating a wide variety of physical requirements for players; (c) configuring a button deck to allow easy access to credentialed operators; and (d) providing a display screen or device proximate to a pedestal system (e.g., spaced a distance from the pedestal system, but in communication with the pedestal system) that can be easily accessed and changed by credentialed operators.

Figure 1:
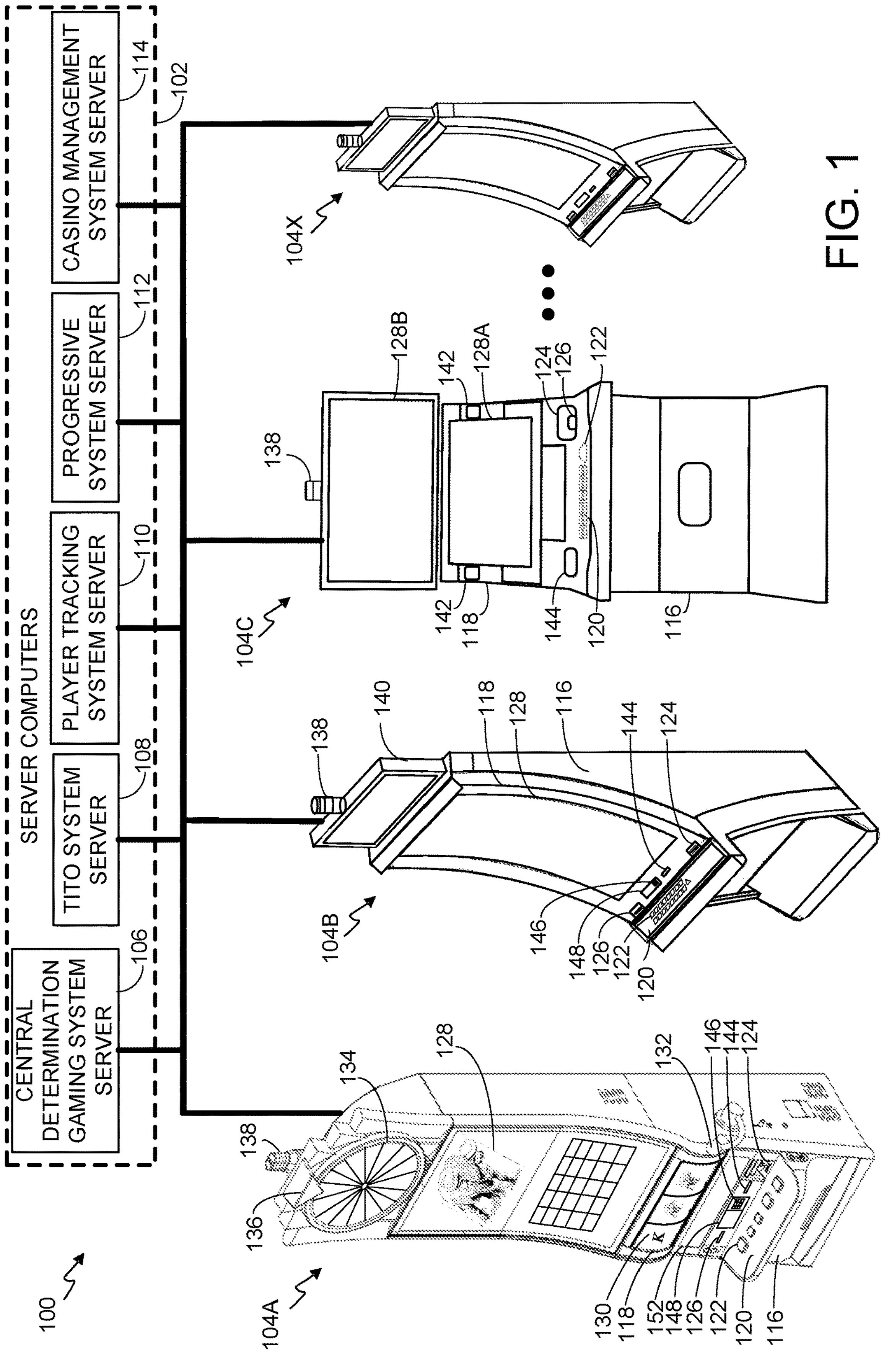
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
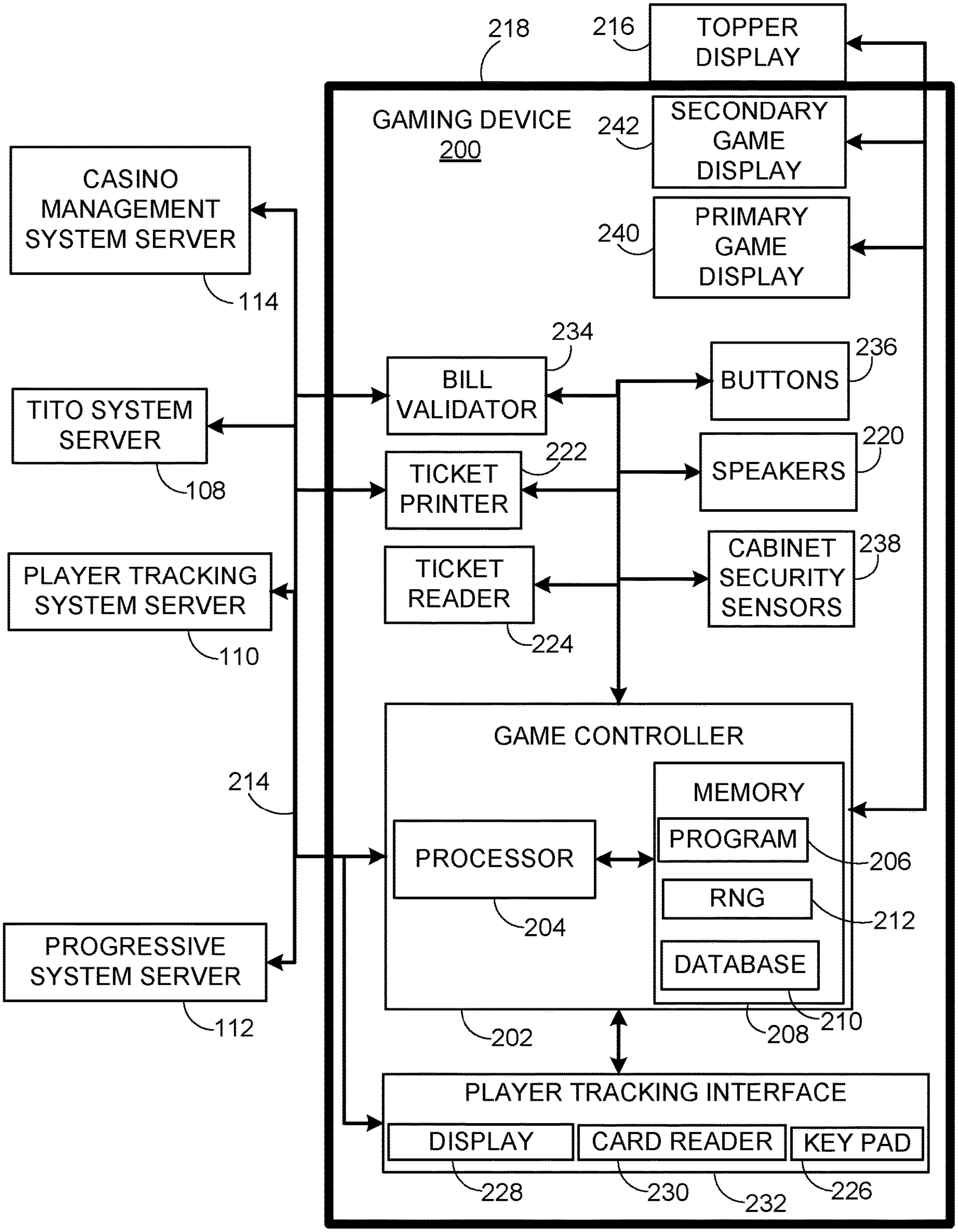
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

Figure 3:
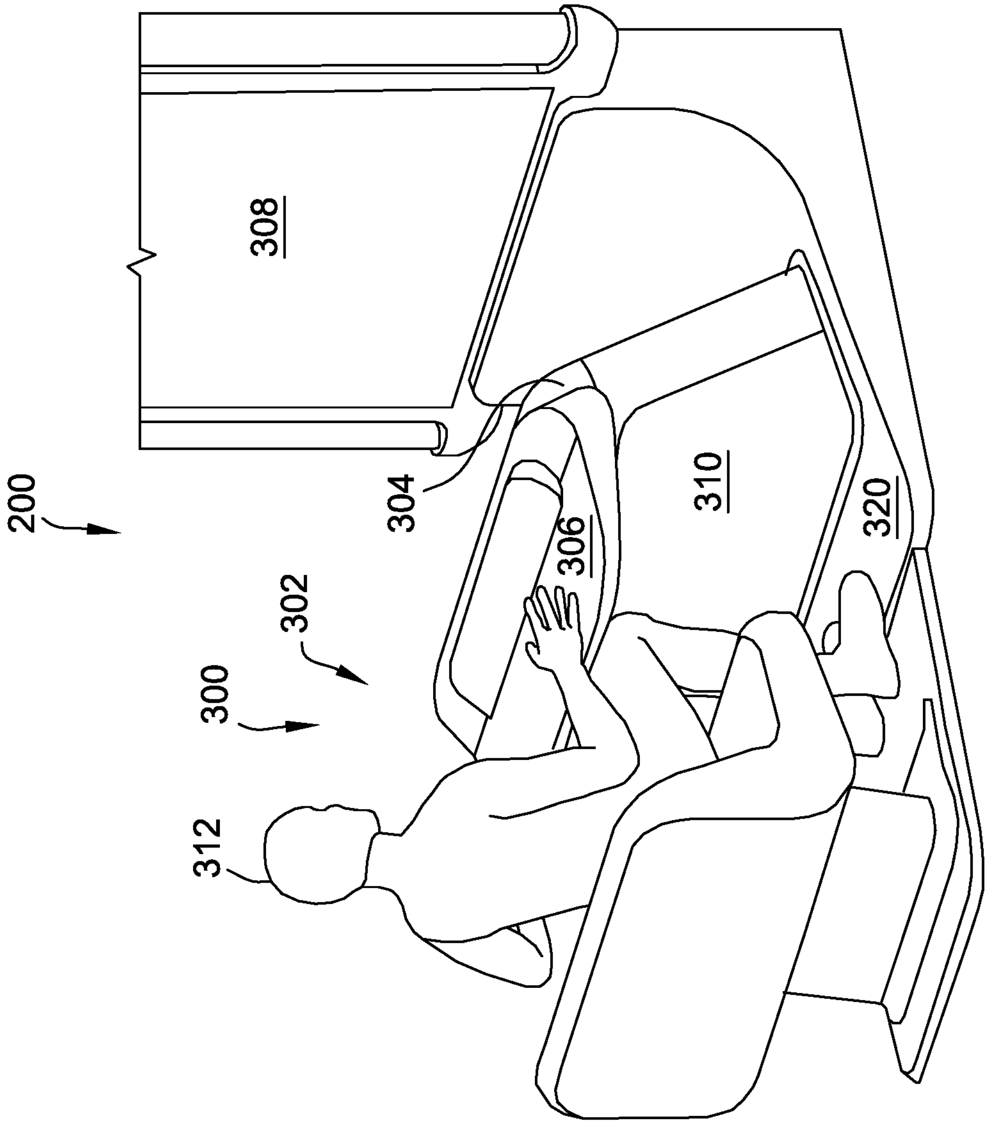
FIG. 3 is an exemplary diagram showing a pedestal system with an access door in accordance with the present disclosure.

Another model of an EGM can be the type shown in FIG. 3, where the pedestal system includes button deck 120, bill validator 124, TITO printer 126, and other components described herein. The EGM shown in FIG. 3 also includes a display device spaced apart from the pedestal as opposed to, for example, above the pedestal.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of. 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 4:
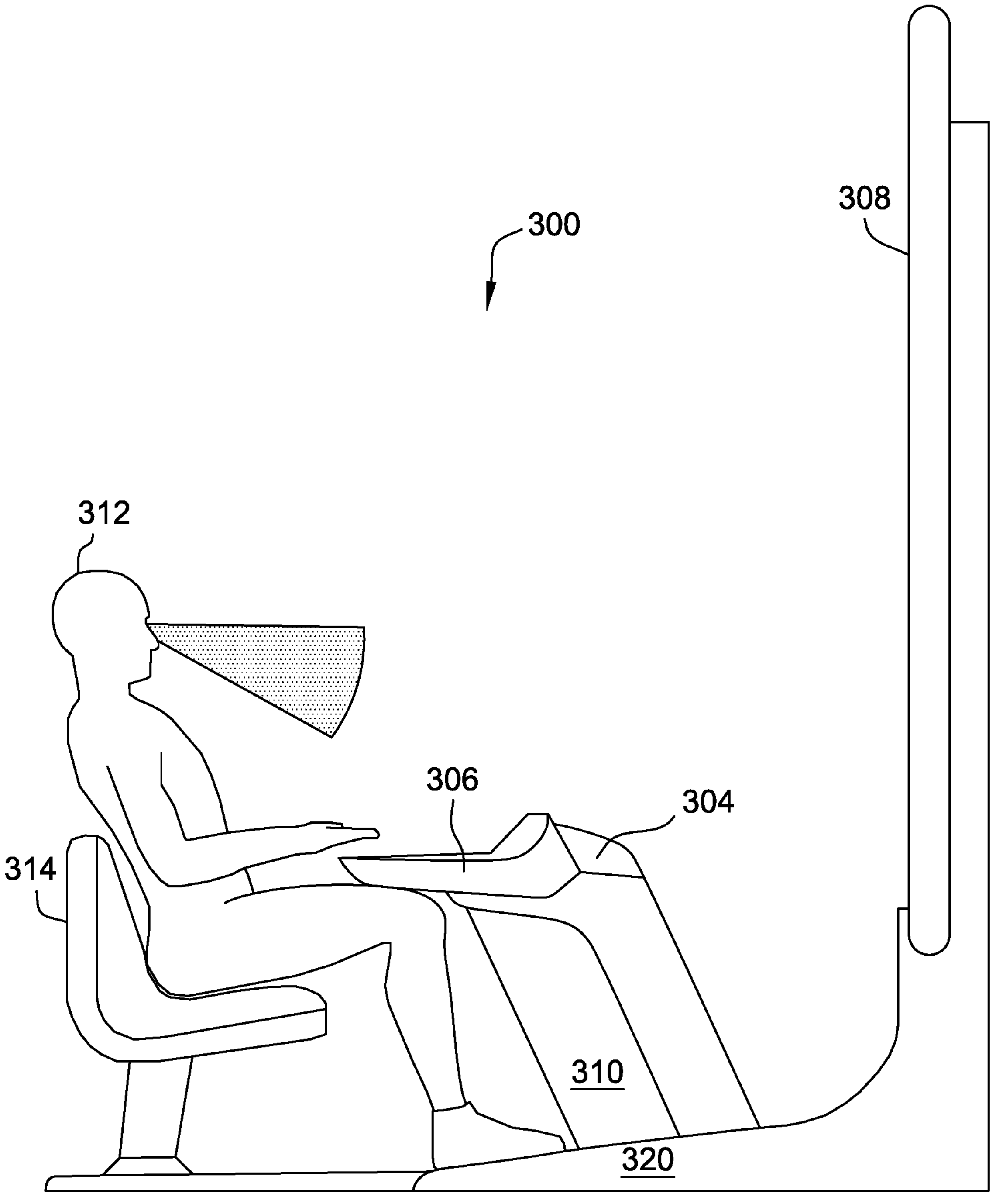
FIG. 4 is an exemplary diagram showing a side view of the pedestal system shown in FIG. 3.

FIG. 3 is an exemplary diagram showing a perspective view of a pedestal system 300 including a pedestal 302 and display 308 in accordance with the present disclosure. FIG. 4 is an exemplary diagram showing a side view of pedestal 302 and display 308 in accordance with the present disclosure. In the example embodiment shown in FIGS. 3 and 4, pedestal system 300 is an electronic gaming machine such as gaming devices 104 and 200 (shown in FIGS. 1 and 2). Display device 308 is a display device upon which an electronic game may be displayed (e.g., during game play). Pedestal 302 is set apart from display 308 and, in the example embodiment, acts as a secure enclosure for various gaming device components. Pedestal 302 includes an access door 304, allowing access to an interior portion of pedestal 302 and the various components of pedestal 302. Pedestal 302 also includes a button deck 306 which is used by a player 312 to play an electronic game. In some embodiments, button deck 306 may be similar to button deck 120 and may include buttons 122, 236 (e.g., in a button panel), a touchscreen, and/or virtual buttons.

In the example embodiment, button deck 306 and access door 304 are rotatably coupled to a base 310 of pedestal 302, for example by a limited-torque hinge. In the example embodiment, base 310 is coupled to or includes a footrest 320 such that a front side of footrest 320 and base 310 are positioned at an acute angle relative to each other. In some embodiments, footrest 320 and base 310 may be positioned at or near ninety degrees relative to each other so that base 310 is in a more upright position. During game play, a player 312 seated in a chair 314 interacts with the buttons on button deck 306 in order to operate the electronic game. In some embodiments, pedestal 302 may be a standalone cabinet with no chair 314 such that player 312 can operate gaming device 200 while standing up. In some embodiments, chair 314 is wider than shown in FIG. 3, such that more than one player 312 can be seated during game play. In some embodiments, button deck 306 may be configured to include more than one set of buttons 122 such that multiple players 312 can play the electronic game.

In the example embodiment, pedestal 302 is positioned with a gap between pedestal 302 and display device 308 such that a credentialed operator can easily access display device 308 if required. Because display device 308 is located behind pedestal 302 instead of, for example, above pedestal 302, a credentialed operator can more easily access display device 308. In some embodiments, display device 308 may be closer or farther away from pedestal 302 than is shown in FIGS. 3 and 4. In some embodiments, display device 308 may be attached to a wall or hung from the ceiling, for example. In some embodiments, display device 308 may be coupled to pedestal 302. In some embodiments, display 308 may be straight/flat as shown in FIGS. 3 and 4. In some embodiments, display 308 may be curved or formed in to other shapes (e.g., a curved portrait display or landscape display).

Figure 5:
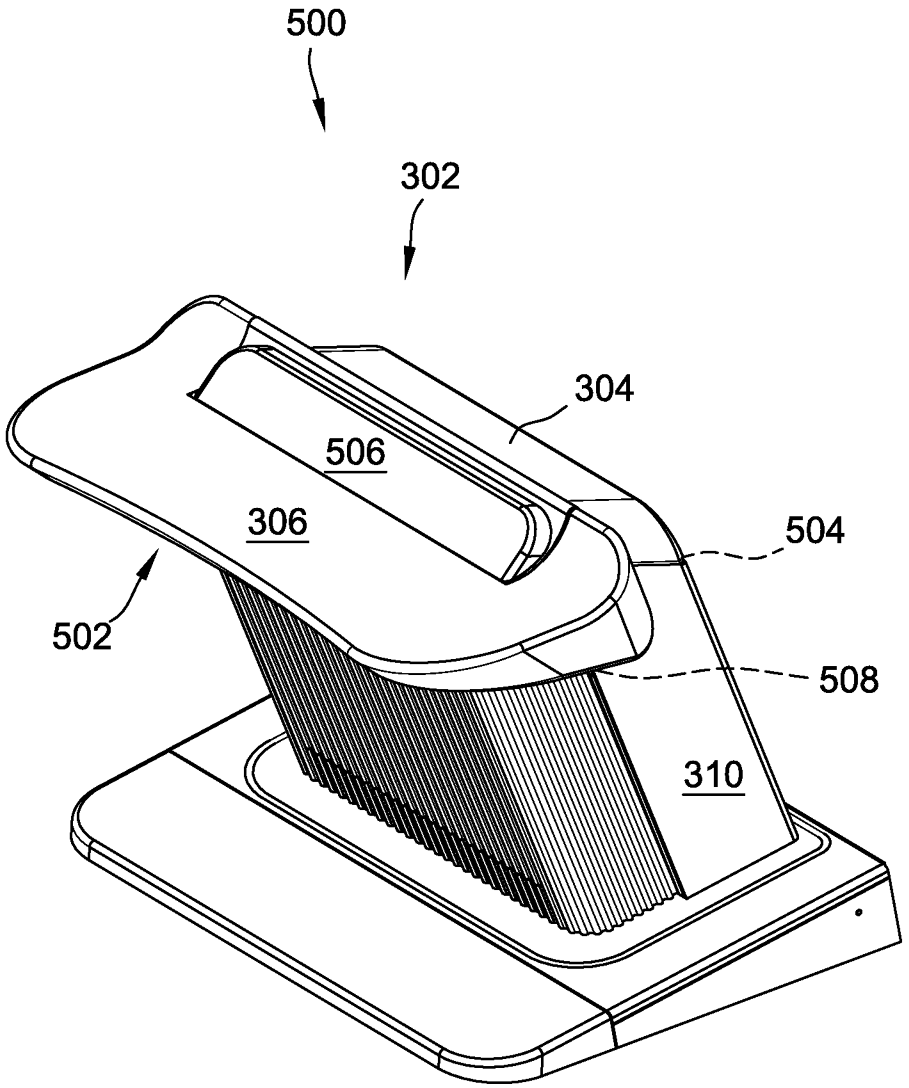
FIG. 5 is an exemplary diagram showing a perspective view of the pedestal system shown in FIG. 3.

Pedestal system 300 provides for restricted access to an interior portion of pedestal 302 by way of access door 304 and button deck 306. More specifically, in the example embodiment, access door 304 and button deck 306 are rotatably coupled to pedestal 302 such that one or both of access door 304 and button deck 306 may rotate between closed positions (e.g., as shown in FIGS. 4 and 5) and open positions. During various service operations, service technicians or other support personnel (e.g., "credentialed operators") may need access to components housed within pedestal 302. For example, support personnel may refill ticket paper of a ticket printer (e.g., printer 802 shown in FIG. 8, used, for example, to print TITO tickets) housed within the pedestal 302, retrieve a cash box (e.g., cash box 1102 shown in FIG. 11, used, for example, to hold cash and tickets provided by players 312), replace malfunctioning components, perform software support or accounting functions (e.g., device resets, memory clears, software installations), or such. In the example embodiment, interior access to pedestal 302 and the various enclosed components is provided through rotation of one or more of access door 304 and button deck 306, thereby providing access to the interior portion from above. FIGS. 5-11 illustrate example embodiments and various access configurations and operations for pedestal system 300 in greater detail.

Figure 6:
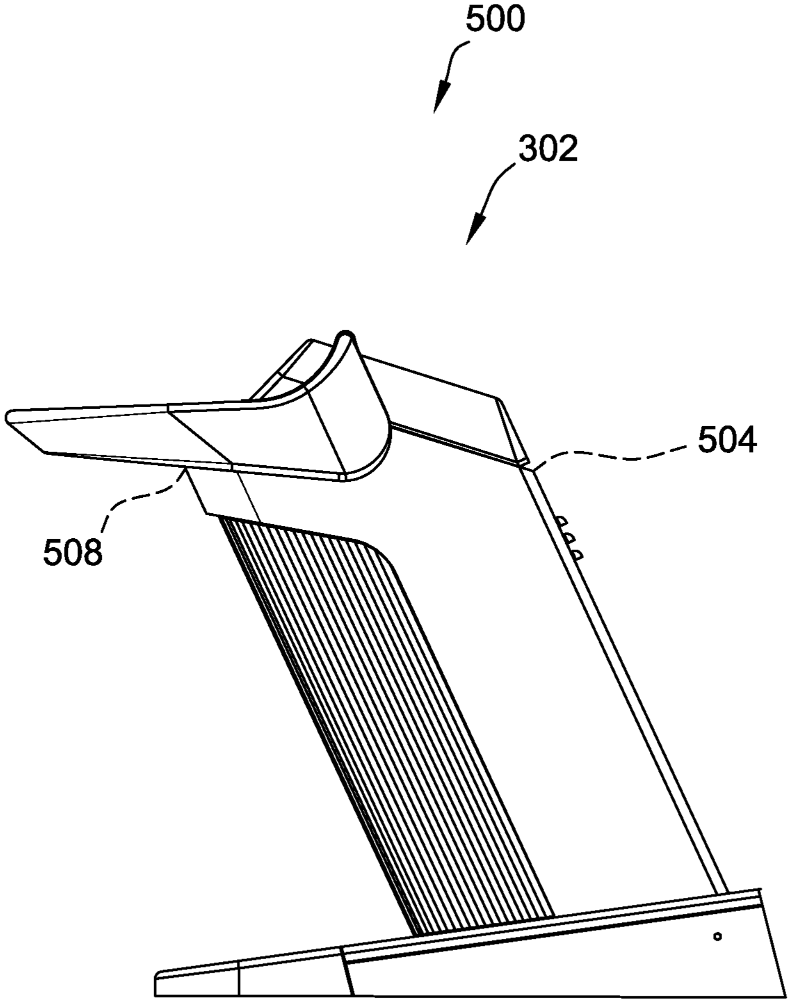
FIG. 6 is an exemplary diagram showing a side view of the pedestal system shown in FIG. 3.

FIG. 5 is an exemplary diagram showing a perspective view of pedestal 302 in a closed configuration 500. FIG. 6 is an exemplary diagram showing a side view of pedestal 302 in closed configuration 500.

In the example embodiment, a door handle 502 on the underside of button deck 306 may be used by an operator to release access door 304. In some embodiments, door handle 502 may resemble a truck tail gate. In some embodiments, access door 304 may be opened by using a key. In some embodiments, a door alarm is triggered upon access door 304 being opened. When access door 304 is released, it may be rotated on an access door rotation axis 504. When access door 304 is in an open position, a latch 704, or other mechanism as described below, may be used release button deck 306. When button deck 306 is released, it may be rotated on a button deck rotation axis 508 from a closed position to an open position.

In some embodiments, a front portion 506 of access door 304 may include additional components such as, for example, a display, display area, speakers (e.g., speakers 142), and additional buttons, in some embodiments similar to buttons 122.

Figure 7:
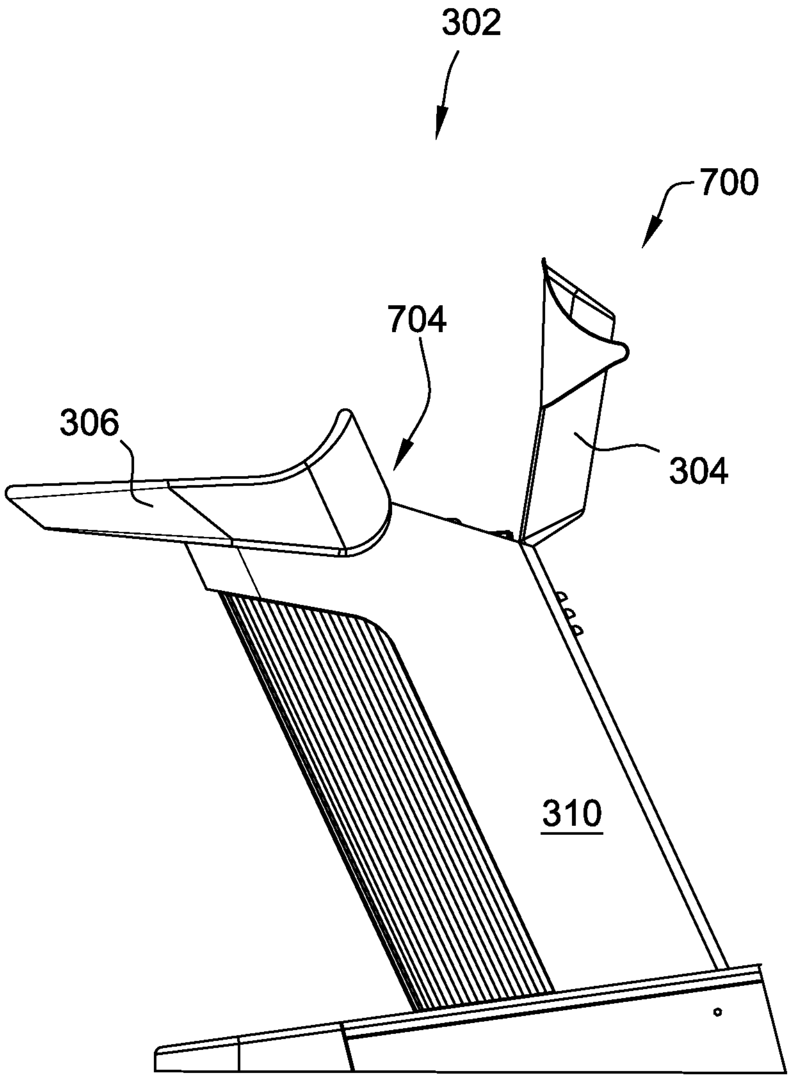
FIG. 7 is an exemplary diagram showing a side view of the pedestal system shown in FIG. 3 with an access door opened.
Figure 8:
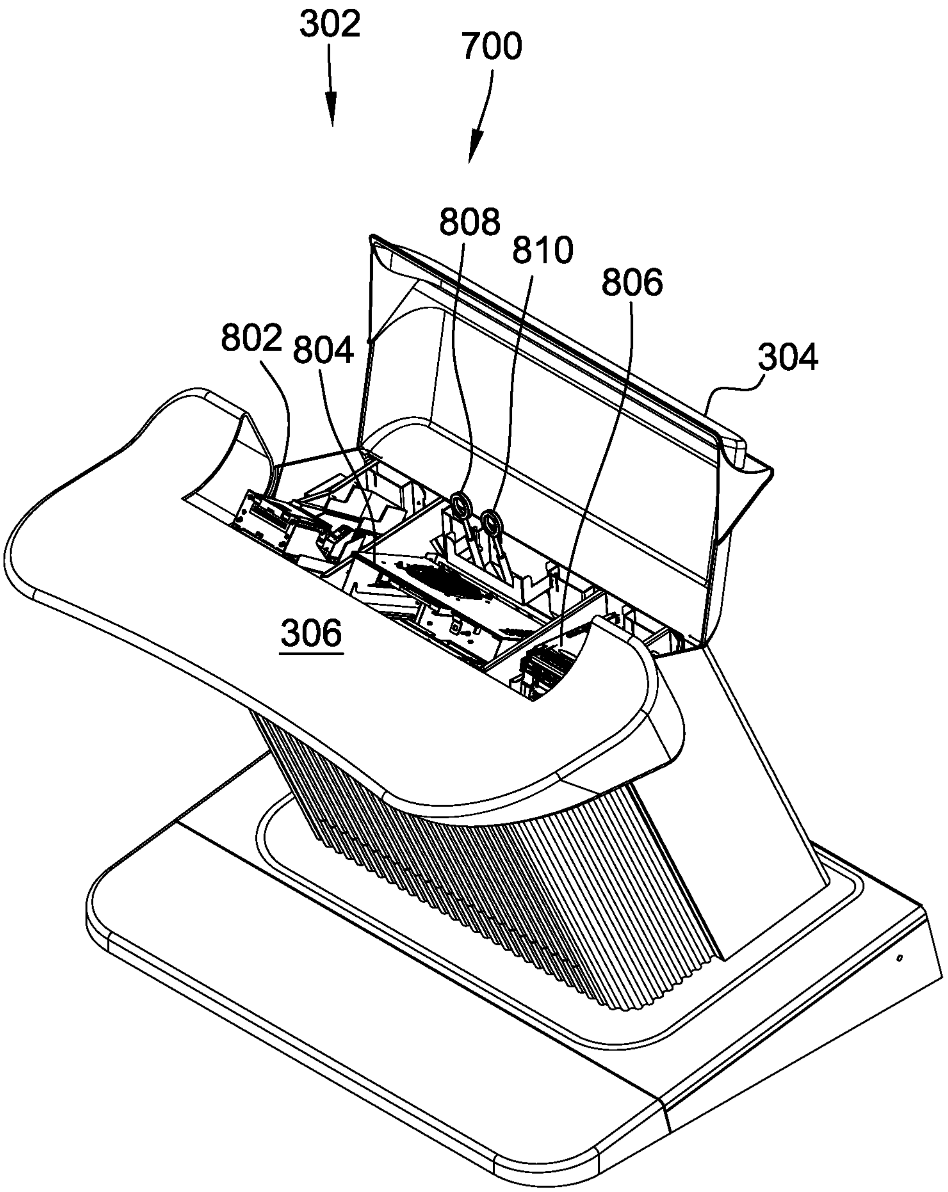
FIG. 8 is an exemplary diagram showing a perspective view of the pedestal system shown in FIG. 3 with an access door opened.

FIG. 7 is an exemplary diagram showing a side view of pedestal 302 with access door 304 in an open position 700. FIG. 8 is an exemplary diagram showing a perspective view of pedestal 302 with access door 304 in open position 700.

As explained above, access door 304 may be opened by an operator using, as examples, door handle 502 and/or a key. In the example embodiment, access door 304 rotates on access door rotation axis 504 to a range of ninety degrees to one-hundred-eighty degrees with respect to the horizontal plane. In some embodiments, access door 304 may only rotate to an angle of less than ninety degrees with respect to the horizontal plane. In the example embodiment, access door 304 is proximate to a top of pedestal 302, is generally in a horizontal orientation when in a closed position (e.g., as is shown in closed configuration 500), and is generally in a vertical orientation when in open position 700.

As shown in FIG. 8, inner components of pedestal 302 may be accessed when access door 304 is in open position 700. Inner components of pedestal 302 may include a printer 802, a logic cage 804, and a bill validator 806 (i.e., a bill note acceptor, or BNA). In some embodiments, printer 802 embodies ticket printer 222. In some embodiments, logic cage 804 embodies game controller 202. In some embodiments, bill validator 806 embodies bill validator 234.

When access door 304 is in an open position, an operator can access inner components of pedestal 302, as described below in greater detail. Further, an operator can access a latch 704 that is configured to release button deck 306. In some embodiments, pull pins may be used to release button deck 306 instead of latch 704. In some embodiments security screws configured to be coupled to button deck 306 may be accessed when access door 304 is in open position 700.

In some embodiments, release pins 808, 810 are included inside pedestal 302. In the embodiment shown in FIG. 8, release pin 808 is associated with button deck 306 and release pin 810 is associated with access door 304. For example, when release pin 808 is actuated, button deck 306 may be removed from pedestal 302 (e.g., in order to replace or repair button deck 306). Similarly, when release pin 810 is actuated, access door 304 may be removed from pedestal 302.

Figure 9:
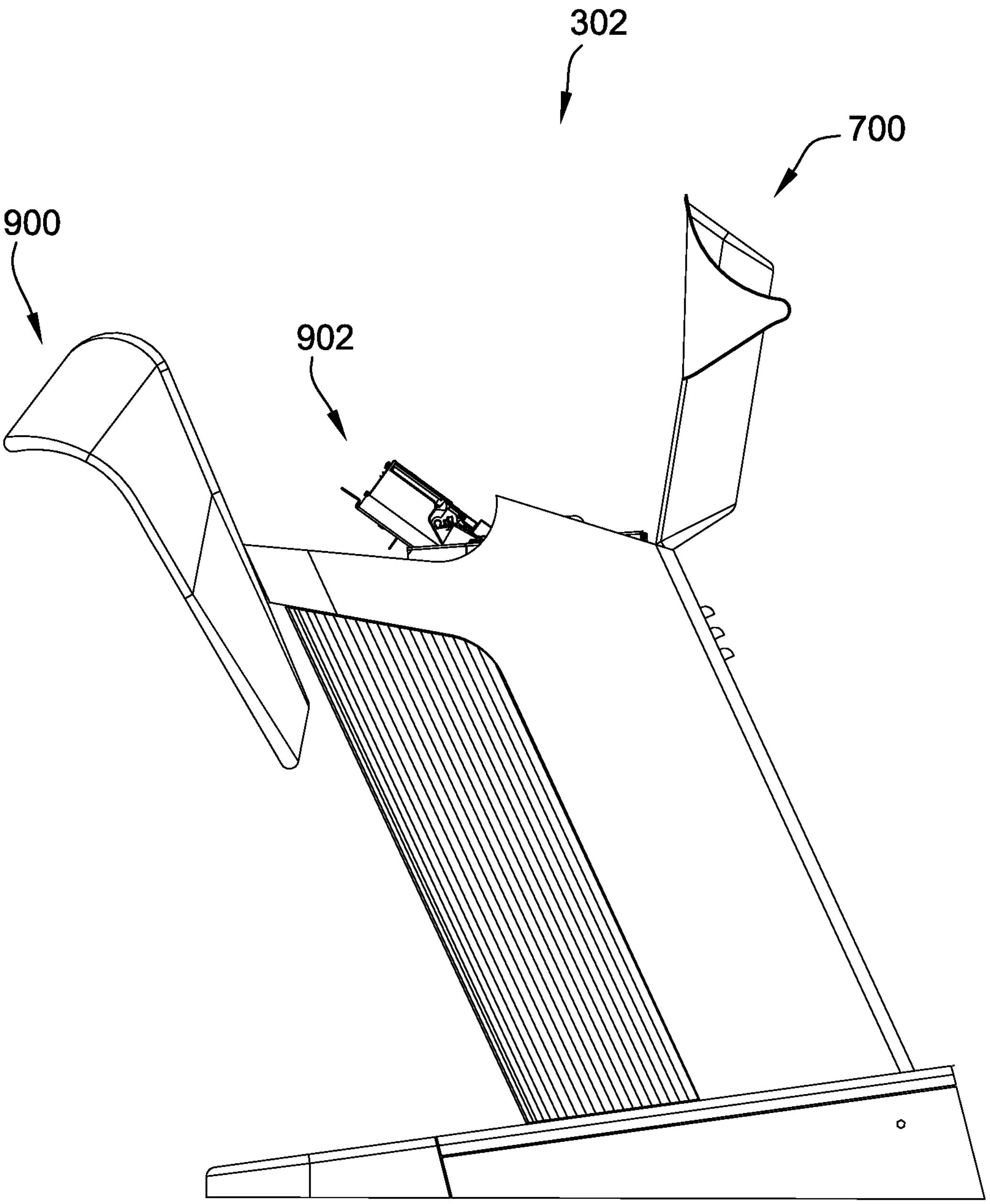
FIG. 9 is an exemplary diagram showing a side view of the pedestal system shown in FIG. 3 with an access door opened and a button deck rotated forward.
Figure 10:
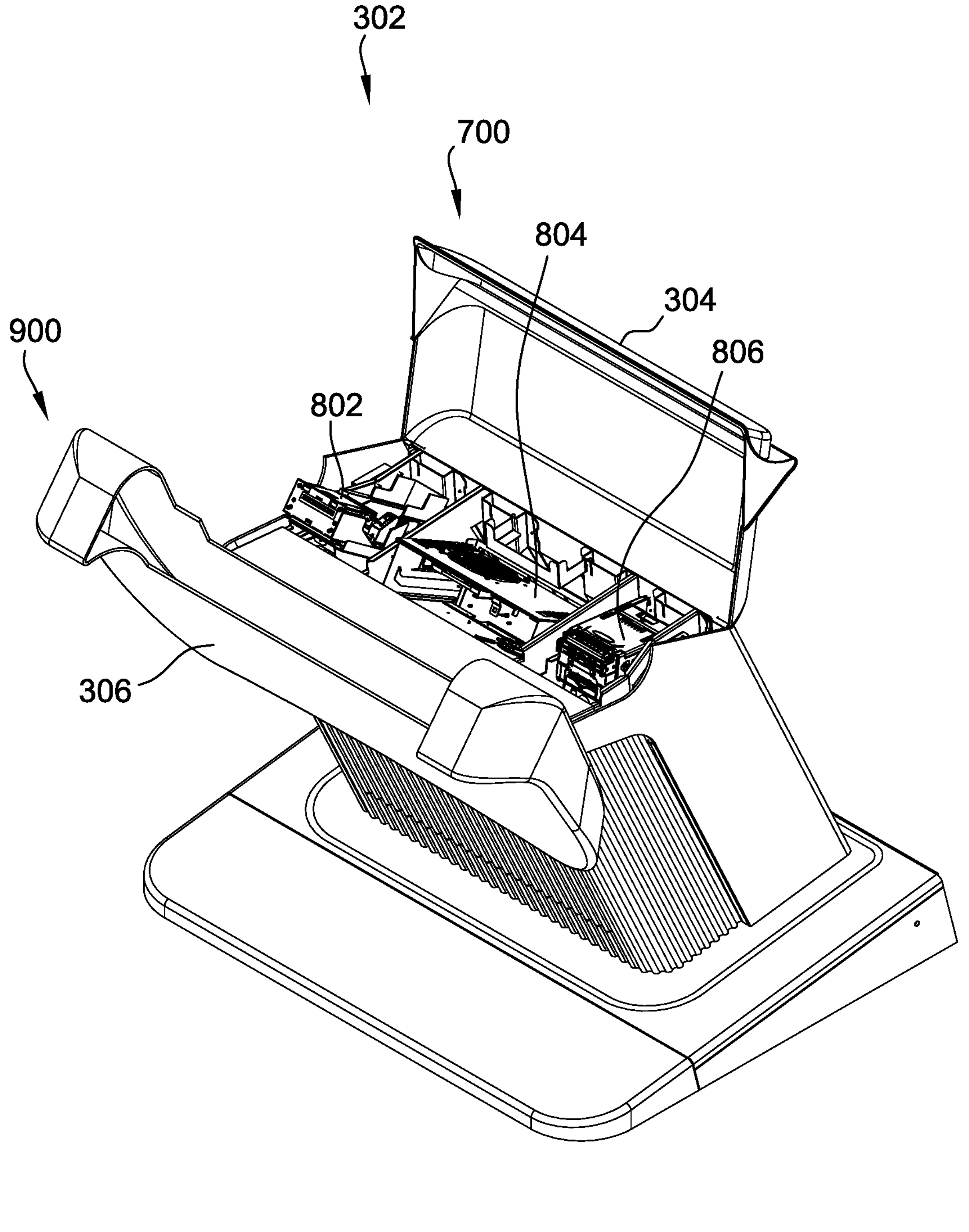
FIG. 10 is an exemplary diagram showing a perspective view of components inside the pedestal system shown in FIG. 3.

FIG. 9 is an exemplary diagram showing a side view of pedestal 302 with access door 304 in open position 700 and button deck 306 in an open position 900. FIG. 10 is an exemplary diagram showing a perspective view of pedestal 302 with access door 304 in open position 700 and button deck 306 in open position 900.

In some embodiments, button deck 306 may be in open position 900 while access door 304 is in a closed position. In the example embodiment, button deck 306 rotates on a button deck rotation axis 508 to a range of ninety degrees to one-hundred-eighty degrees with respect to the horizontal plane. In some embodiments, button deck 306 may only rotate to an angle of less than ninety degrees with respect to the horizontal plane. When button deck 306 is in open position 900 it is at an angle greater than or equal to ninety degrees with respect to a horizontal plane. In the example embodiment, button deck 306 is proximate to a top of pedestal 302, is generally in a horizontal orientation when in a closed position (e.g., as is shown in closed configuration 500), and is generally in a vertical orientation when in open position 900.

In some embodiments, while components inside pedestal 302 may be accessed when only access door 304 is in open position 700, having both of button deck 306 and access door 304 in an open positions 900 and 700 respectively allows for easier access to inner components of pedestal 302. Further, having button deck 306 in open position 900 may allow for easier removal of components of button deck 306 such as buttons 122, sets of buttons 122, a display, a touchscreen, and other components of button deck 306. For example, while components of button deck 306 may be accessed while access door 304 is in open position 700, if they are instead accessed when access door 304 and button deck 306 are in open positions 700 and 900 respectively the components may be easier to remove because they could be slid on to, for example, chair 314. This is particularly useful when replacing a button panel of button deck 306 including, for example, at least one button 122. Further, rotating button deck 306 forward makes it easier to replace button deck 306 with a new button deck. In some embodiments, when button deck 306, or any new attached button deck, is rotated back to a closed position, button deck 306 has a seamless appearance.

Figure 11:
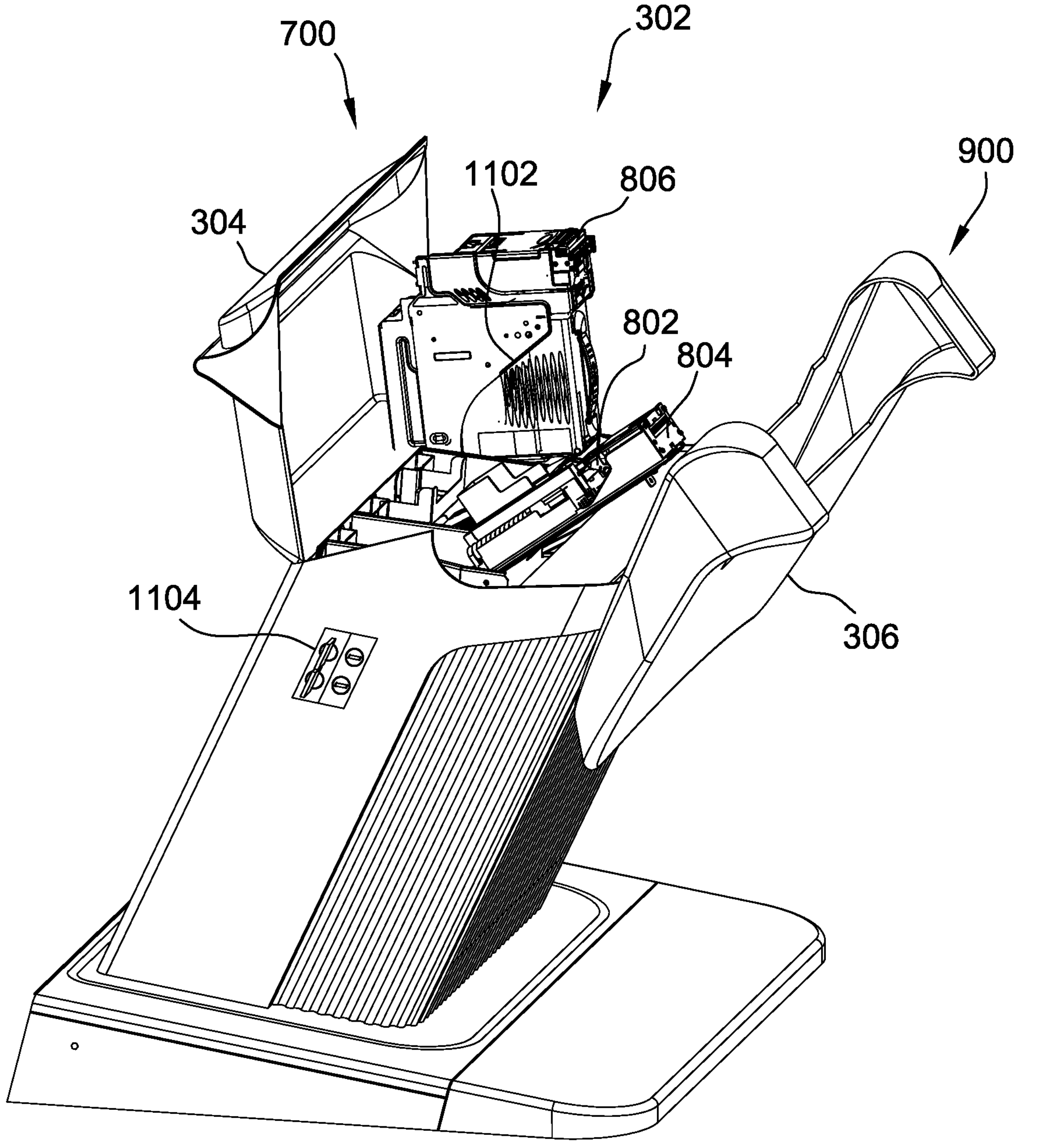
FIG. 11 is an exemplary diagram showing a side view of components inside the pedestal system shown in FIG. 3.

FIG. 11 is an exemplary diagram showing a side view of components inside pedestal system 300. In the example embodiment, each of printer 802, logic cage 804, and bill validator 806 are removably coupled to a housing configured to receive the body of one of printer 802, logic cage 804, and bill validator 806. The body of each of printer 802, logic cage 804, and bill validator 806 defines the parts and pieces of printer 802, logic cage 804, and bill validator 806 respectively. Each housing is removably coupled to a frame, which is removably coupled to a spring loaded mechanism (e.g., a gas extension spring) and bearing rails such that, when the spring loaded mechanism is actuated/activated, the housing removably coupled to the spring loaded mechanism extends upward along the frame/bearing rails such that the body of the component removably coupled to the housing is more easily accessible by a qualified operator. In some embodiments, the spring loaded mechanisms may be actuated upon release of a latch. In some embodiments only some housings of the inner components are removably coupled to spring loaded mechanisms. In some embodiments, none of the housings of the inner components are coupled to spring loaded mechanisms. However, even when the housings of the inner components are not removably coupled to spring loaded mechanisms, they are still easily vertically accessible when one of access door 304 and button deck 306 are in open position 700 and 900 respectively.

As an example, a housing removably coupled to printer 802 may be removably coupled to a spring loaded mechanism such that, when the spring loaded mechanism is actuated, printer 802 extends upward diagonally along a frame as is shown in FIG. 11. Further, a housing removably coupled to logic cage 804 may be removably coupled to a spring loaded mechanism that, when actuated, extends logic cage 804 upward diagonally along a frame as is shown in FIG. 11. Yet further, a housing removably coupled to bill validator 806 may be removably coupled to a spring loaded mechanism such that when the spring loaded mechanism is actuated bill validator 806 extends upward in a substantially vertical direction. A housing removably coupled to bill validator 806 being removably coupled to such a spring loaded mechanism is particularly beneficial in that it allows for a cash box 1102 to be accessed more easily by a qualified operator than it would be when cash box 1102 is positioned farther down inside pedestal 302. For further security, a third door (not shown) may be located above bill validator 806. A security key, for example, may be required to unlock the third door. In some embodiments, the spring loaded mechanism removably coupled to the housing of bill validator 806 may only be actuated once the third door is open. Accordingly, only operators with the security key, or other security mechanism in some embodiments, are able to access cash box 1102. In some embodiments the housings of printer 802, logic cage 804, and bill validator 806 may be removably coupled to mechanisms other than a spring loaded mechanism, that still allow for these inner components of pedestal 302 to extend upward. Even though access door 304 and button deck 306 are shown in open positions 700 and 900 respectively in FIG. 11, the inner components of pedestal 302 may extend upward when only one of access door 304 and button deck 306 are in open positions 700 and 900 respectively. In some embodiments, the inner components of pedestal 302 may only partially extend upward out of pedestal 302 and may not be in a fully extended position as shown in FIG. 11.

In other embodiments, logic cage 804 may be positioned further down the inside of pedestal 302 as compared to the embodiment described above. More specifically, in these other embodiments, logic cage 804 is located below what is shown in FIG. 10 and FIG. 11, and a player tracking system (e.g., in communication with player tracking system server 110 and player tracking interface 232) is positioned above logic cage 804 such that the player tracking system is more easily accessed by technicians. In some embodiments, the player tracking system may be removably coupled to a housing wherein the housing is removably coupled to a spring-loaded mechanism (e.g., as described above) such that when the spring loaded mechanism is actuated the player tracking system extends upward. In other embodiments, the player tracking system may be stationary (e.g., does not extend upward). Embodiments wherein the player tracking system is positioned above logic cage 804 may be particularly beneficial in situations where the player tracking system needs to be accessed more frequently than logic cage 804. Positioning logic cage 804 underneath the player tracking system provides further security to logic cage 804 and helps keep certain technicians from accessing logic cage 804.

In some embodiments, as shown in FIG. 11, in order to rotate access door 304 or button deck 306, a key may need to be inserted into at least one keyhole 1104 and rotated. Once a key is inserted and rotated, access door 304 and/or button deck 306 are unlocked such that they may be rotated from a closed position to an open position. In some embodiments, a single key and keyhole may be associated with both access door 304 and button deck 306. In some embodiments, separate keys and keyholes may be associated with each of access door 304 and button deck 306. In some embodiments, multiple keys and keyholes may be associated with each of access door 304 and button deck 306. Each of access door 304 and button deck 306 may include a handle pocket to help an operator rotate access door 304 and button deck 306 between open and closed positions.

In some embodiments, additional doors may be located inside of pedestal 302. For example, an additional door may be placed above each inner component (e.g., printer 802, logic cage 804, and bill validator 806) in order to provide further security for the inner components. The additional doors may each require a key to become unlocked. Accordingly, access to each inner component may be individually controlled such that an operator with access to one inner component may not have access to other inner components. For example, an operator may need to access cash box 1102 on a frequent basis in order to collect cash. However, this operator would only require access to bill validator 806 and cash box 1102, not printer 802 and logic cage 804. Thus, this example operator would only have a key, for example, to unlock the additional door placed above bill validator 806. In some embodiments, instead of additional doors located inside of pedestal 302, access door 304 may include a plurality of access doors, each located above and associated with at least one inner component. In some embodiments, for example, instead of one access door 304 there may be three separate access doors, one located above and associated with each of printer 802, logic cage 804, and bill validator 806.

Figure 12:
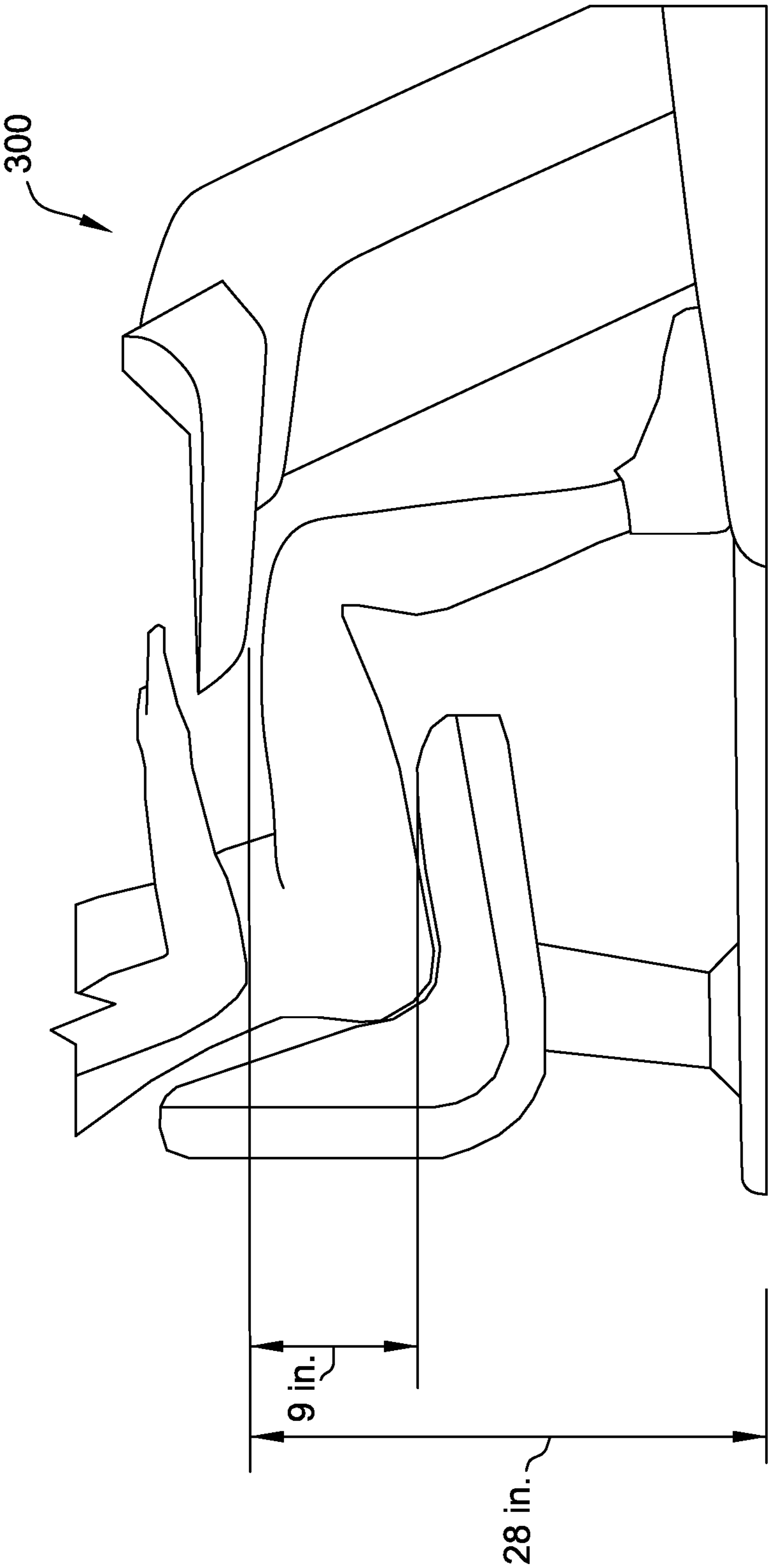
FIG. 12 is an exemplary diagram showing a side view of the pedestal system shown in FIG. 3.

FIG. 12 is an exemplary diagram showing a side view of pedestal 302 demonstrating legroom available to a user of pedestal 302. In some embodiments, a bottom side 316 of button deck 306 is configured to be 28.6 inches, or in a range of 25-30 inches, off the ground such that player 312 has enough leg room to comfortably sit in chair 314 with their legs under button deck 306. In some embodiments, bottom side 316 of button deck 306 is configured to be 9 inches above a top side 318 of chair/seat 314. In some embodiments top side 318 of chair 314 is configured to be 16 inches off the ground.

Figure 13:
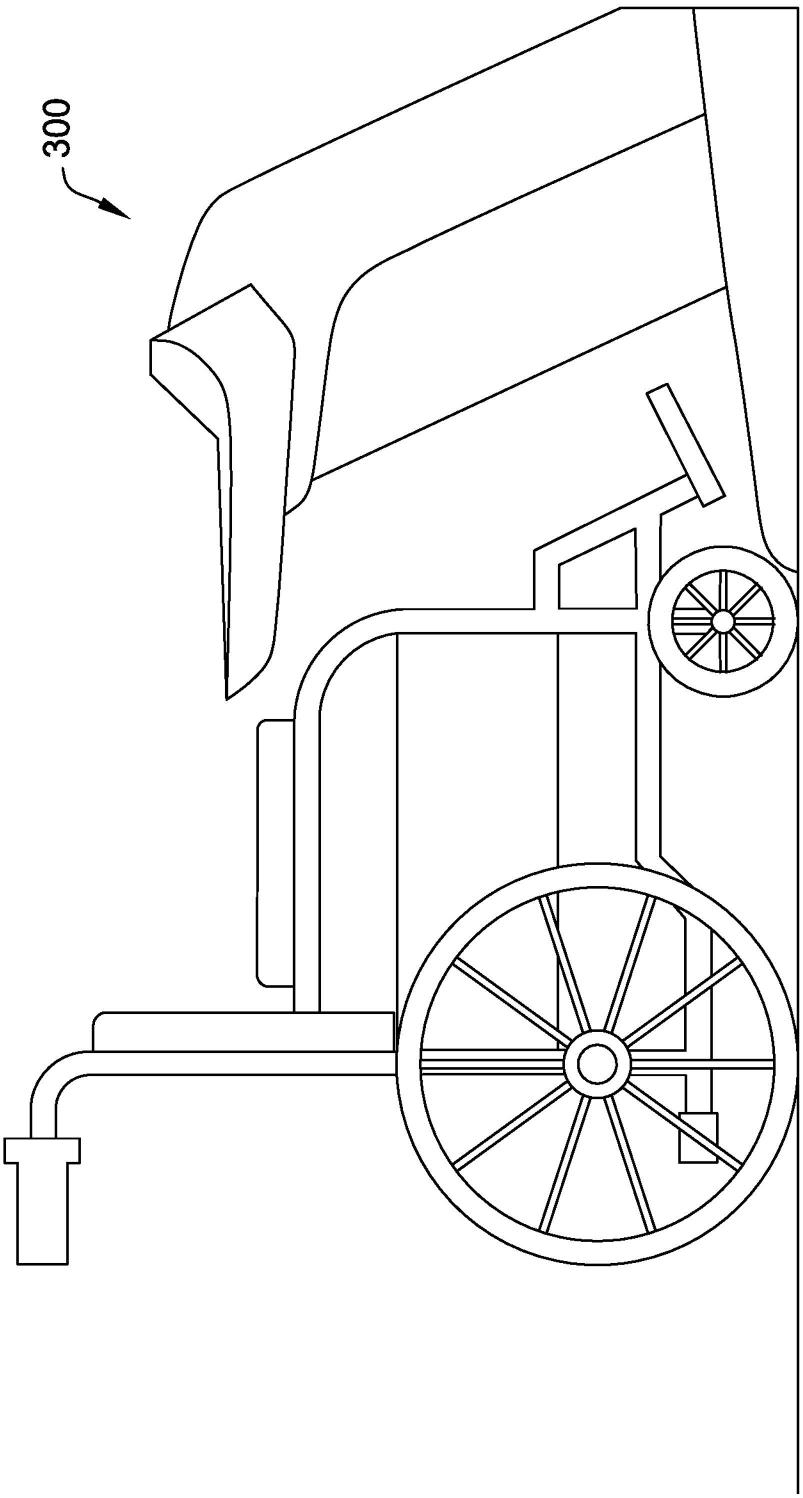
FIG. 13 is an exemplary diagram showing a side view of the pedestal system shown in FIG. 3.

FIG. 13 is an exemplary diagram showing a side view of pedestal 302 demonstrating the wheelchair accessibility of pedestal 302.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A pedestal-style electronic gaming machine (EGM) comprising:

a pedestal;

an access door rotatably coupled to the pedestal between a first open position and a first closed position, wherein the access door is configured to allow access to an interior portion of the pedestal when the access door is in the first open position;

a bill validator located in the interior portion of the pedestal, wherein the bill validator is coupled to a spring-loaded mechanism configured to extend the bill validator out of the interior portion of the pedestal; and a button deck comprising one or more of a display and a button panel comprising one or more buttons, the button deck being rotatably coupled to the pedestal between a second open position and a second closed position, wherein the button deck is configured to allow access to the interior portion of the pedestal when the button deck is in the second open position.

2. The pedestal-style EGM of claim 1, wherein at least one security screw coupled to the button deck is accessible when the access door is in an open position.

3. The pedestal-style EGM of claim 1, wherein the access door is positioned proximate to a top of the pedestal, is in a horizontal orientation when in the first closed position, and is in a vertical orientation when in the first open position.

4. The pedestal-style EGM of claim 1, further comprising a display device spaced apart from the pedestal.

5. The pedestal-style EGM of claim 4 wherein the display device is spaced a distance away from the pedestal such that the display device does not interfere with vertical access to the interior portion of the pedestal.

6. The pedestal-style EGM of claim 4 wherein the display device is spaced a distance away from the pedestal to allow full rotation of the access door between the first open position and the first closed position and the button deck between the second open position and the second closed position.

7. An electronic gaming machine (EGM) comprising:

a pedestal;

an access door rotatably coupled to the pedestal between an open position and a closed position, wherein the access door is configured to allow access to an interior portion of the pedestal when the access door is in the open position;

a button deck comprising one or more of a display and a button panel comprising one or more buttons; and a bill validator located in the interior portion of the pedestal, wherein the bill validator is coupled to a spring-loaded mechanism configured to extend the bill validator out of the interior portion of the pedestal.

8. The EGM of claim 7, wherein the bill validator is configured to be removably coupled to a housing.

9. The EGM of claim 8, wherein when the access door is in the open position, the spring-loaded mechanism is actuated such that the bill validator extends upward out of the interior portion of the pedestal.

10. The EGM of claim 9, wherein when the bill validator extends upward out of the interior portion of the pedestal, a cash box located underneath the bill validator is accessible.

11. The EGM of claim 7, wherein the bill validator is located underneath a second access door located in the interior portion of the pedestal.

12. The EGM of claim 11, wherein the bill validator is accessible when the second access door is unlocked.

13. The EGM of claim 7, further comprising a printer located in the interior portion of the pedestal.

14. The EGM of claim 13, wherein the printer is configured to be removably coupled to a housing.

15. The EGM of claim 14, wherein the housing is configured to be removably coupled to a spring-loaded mechanism.

16. The EGM of claim 15, wherein when the access door is in an open position, the spring-loaded mechanism is actuated such that the printer extends upward out of the interior portion of the pedestal.

17. The EGM of claim 7, further comprising a logic cage located in the interior portion of the pedestal, wherein the logic cage is configured to be removably coupled to a spring-loaded mechanism.

18. The EGM of claim 17, wherein when the access door is in an open position, the spring-loaded mechanism is actuated such that the logic cage extends upward out of the interior portion of the pedestal.

19. A method of manufacturing a gaming device, the method comprising:

coupling an access door to a pedestal, wherein the access door is configured to allow access to an interior portion of the pedestal when the access door is in a first open position;

coupling a button deck to the pedestal, wherein the button deck comprises one or more of a display and a button panel comprising one or more buttons and is configured to allow access to the interior portion of the pedestal when the button deck is in a second open position;

rotating the access door of the pedestal from a first closed position to the first open position;

rotating a button deck of the pedestal from a second closed position to the second open position; and accessing a bill validator located in the interior portion of the pedestal, wherein the bill validator is coupled to a spring-loaded mechanism configured to extend the bill validator out of the interior portion of the pedestal.

20. The method of claim 19, further comprising positioning the pedestal a distance away from a display device to allow full rotation of the access door between the first open position and the first closed position and the button deck between the second open position and the second closed position.

* * * * *